(12) United States Patent
Chung et al.

(10) Patent No.: US 9,912,247 B2
(45) Date of Patent: Mar. 6, 2018

(54) DC LINK MODULE FOR REDUCING DC LINK CAPACITANCE

(75) Inventors: Shu-Hung Henry Chung, Mid-Levels (HK); Huai Wang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 0 days.

(21) Appl. No.: 14/131,259

(22) PCT Filed: Jul. 4, 2012

(86) PCT No.: PCT/CN2012/078155
§ 371 (c)(1),
(2), (4) Date: Jun. 12, 2014

(87) PCT Pub. No.: WO2013/004180
PCT Pub. Date: Jan. 10, 2013

(65) Prior Publication Data
US 2014/0347896 A1  Nov. 27, 2014

(30) Foreign Application Priority Data
Jul. 7, 2011 (WO) ................ PCT/CN2011/076955

(51) Int. Cl.
*H02M 5/458* (2006.01)
*H02M 5/42* (2006.01)
*H02M 1/14* (2006.01)

(52) U.S. Cl.
CPC ........... *H02M 5/458* (2013.01); *H02M 1/143* (2013.01); *H02M 5/42* (2013.01)

(58) Field of Classification Search
CPC ...................................... H02M 5/42

USPC ....................................................... 363/39, 34
See application file for complete search history.

(56) References Cited

U.S. PATENT DOCUMENTS

| 5,717,318 A * | 2/1998 | Matsuda | H02M 3/07 |
| | | | 323/273 |
| 6,075,349 A * | 6/2000 | Okayama | H02J 3/1814 |
| | | | 323/207 |
| 6,600,271 B1 * | 7/2003 | Chen | H05B 37/02 |

(Continued)

FOREIGN PATENT DOCUMENTS

CN  2105801 U  5/1992
CN  101087102 A  12/2007

*Primary Examiner* — Jue Zhang
*Assistant Examiner* — Trinh Dang
(74) *Attorney, Agent, or Firm* — Renner Kenner Greive Bobak Taylor & Weber

(57) ABSTRACT

A dc link module for a power circuit includes a first connector for connecting to a first power conversion circuit, a second connector for connecting to a second power conversion circuit, wherein the second power conversion circuit is connected to a load circuit arranged to at least intermittently operate as a power source to the power circuit, at least one dc link capacitors arranged between said first connector and said second connector for processing a voltage signal received at said first connector or said second connector, and at least one voltage compensation circuits arranged between said first connector and said second connector, said one or more voltage compensation circuits arranged to generate a voltage signal to compensate an ac ripple component in a dc voltage signal appearing across the at least one dc link capacitor.

11 Claims, 14 Drawing Sheets

(56) References Cited

U.S. PATENT DOCUMENTS

| | | | | |
|---|---|---|---|---|
| 2007/0236966 A1* | 10/2007 | Uruno | ................... | H02M 3/158 |
| | | | | 363/20 |
| 2009/0251000 A1* | 10/2009 | Su | ....................... | B60L 11/1887 |
| | | | | 307/9.1 |
| 2010/0231151 A1* | 9/2010 | Ohtani | .............. | H02M 7/53875 |
| | | | | 318/400.09 |
| 2010/0301788 A1* | 12/2010 | Chen | ................... | H02P 21/0003 |
| | | | | 318/400.3 |

* cited by examiner

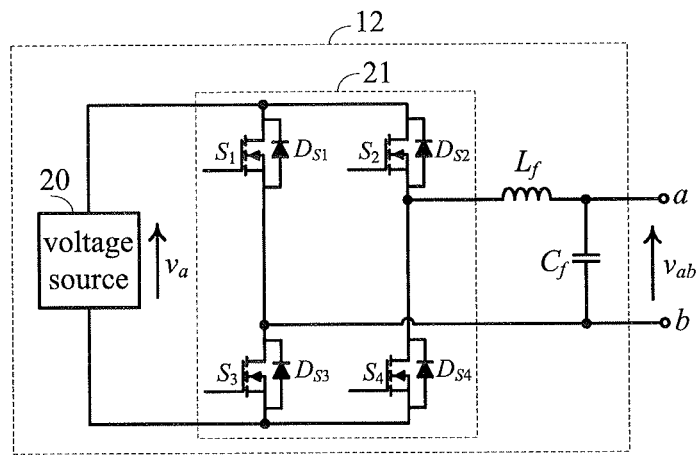
FIG. 3
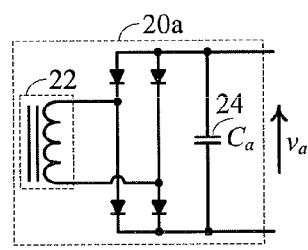 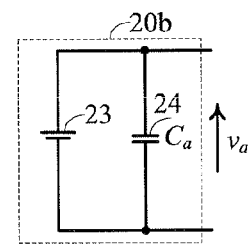 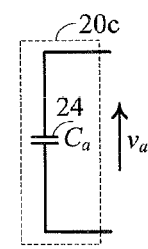
FIG. 4A  FIG. 4B  FIG. 4C

DC LINK MODULE FOR REDUCING DC LINK CAPACITANCE

FIELD OF THE INVENTION

The invention relates to a dc link module for reducing dc link capacitance in a power circuit, a controller for the dc link module, and a method of reducing the capacitance of a dc link in a power circuit using the dc link module.

BACKGROUND OF THE INVENTION

In today's energy and environmentally conscious world, high power density and long life expectancy are critical requirements for electronic systems. In a capacitor-supported power electronic system, the dc-link filter or module is usually the dominant part in terms of both volume and cost. Aluminum electrolytic capacitors provide the highest capacitance values of any type of capacitor. However, the life expectancy of electrolytic capacitors is reduced dramatically with elevated ambient temperatures. For every 10° C. increase in temperature, capacitor life is reduced by half. Thus, capacitors are usually a reliability bottleneck in electronic systems. Statistics reveal that up to 30% of electronic system failures are caused by malfunctions of capacitors.

In particular, for high-voltage high-power conversion systems, dc-link capacitors are usually periodically replaced and monitored for reliable and safe operation, leading to substantial maintenance costs. To enhance reliability and lifetime, power film capacitors have been used as replacements for some aluminum electrolytic capacitors in some capacitor-supported applications, such as wind power converters and LED lamp drivers. However, the benefits of using power film capacitors are to some degree compromised by their reduced volumetric efficiency. The volumetric efficiency of electrolytic capacitor is typically ten times higher than power film capacitors. Thus, for the same value of capacitance, the physical size of a power film capacitor is much larger than that of an electrolytic capacitor.

To lessen the dependency of the dc-link capacitors, many prior-art methods have been proposed to minimize the dc-link capacitance. However, the methodology is often dependent on the circuit structure. Moreover, many methods suffer from distorted input current, high voltage stress on auxiliary components or are not well justified in terms of the reduction of the capacitance that can be achieved.

FIG. 1 shows a typical structure of a power electronics system 100 for applications such as power supplies, electronic ballasts, motor drives, etc. It consists of two power converters 102, 104 connected by a dc link 106. The first converter 102 is used to convert the input either in the form of ac or dc into dc. The second converter 104 is used to provide the required form of power to a load 106. For example, an electronic ballast for driving fluorescent lamps consists of a front-stage power factor corrector that converts the line-frequency (50 Hz or 60 Hz) input into a high-voltage dc (typically 400V). Its second-stage is an inverter that delivers high-frequency power to fluorescent lamps. The frequency of the output is higher than 20 kHz. The two stages are interconnected by a dc link. The dc-link voltage is stabilized by a high-voltage dc-link capacitor. The capacitor is used to absorb the instantaneous power difference between the input source and output load, filter the harmonics generated in the first converter, and provide sufficient energy during the hold-up time of the entire system.

Table I of the drawings shows a comparison between an aluminum electrolytic capacitor and a power film capacitor for a dc link in a circuit such as that of FIG. 1. Aluminum electrolytic capacitors are widely chosen because of their high volumetric efficiency and low cost. However, they suffer from the following drawbacks:

1) High equivalent series resistance (ESR) and low ripple current capability. This implies considerable power loss in the capacitor. To handle the ripple current stress, the overall capacitance required is usually much higher than that for limiting the specified voltage variations on the dc bus.
2) Bottleneck of the voltage rating. For applications with high dc-link voltage, two or more electrolytic capacitors are connected in series to sustain a high voltage dc link. Thus, additional circuits are needed to balance the voltage distributions among the capacitors.
3) Relatively short lifetime compared to other components in a power conversion system. The lifetime of the capacitors can be improved by reducing the stress factors such as temperature, operating voltage and ripple current. This implies that the dc-link capacitance should be designed with considerable margins, leading to further increase in the volume and cost, especially for capacitors with high voltage ratings.
4) Considerable maintenance work. The reliability of aluminum electrolytic capacitors is of much concern in power conversion systems. For industrial applications, it usually necessitates to monitor the conditions of the capacitors and replace them periodically.

Advances in film capacitor technology in the last two decades are emerging to be applied for dc-link filtering. Power film capacitors outperform aluminum electrolytic capacitor counterparts in terms of ESR, life expectancy, environmental performance, dc-blocking capability, ripple current capability and reliability. Although low-voltage and high value film capacitors are commercially available, the capacitance of the high-voltage film capacitors still cannot compete with electrolytic capacitors. The major obstacles of power film capacitors for being widely applied for capacitor-supported applications are their relatively low volumetric efficiency and high cost.

SUMMARY OF THE INVENTION

An active series voltage compensator for reducing dc-link capacitance in a power conversion circuit or system is proposed. Accordingly, a dc-link module comprising the voltage compensator is provided, which is universally applicable to capacitor-supported power electronic systems. The voltage compensator processes only the ripple voltage of the dc-link capacitor and reactive power. It does not affect the input and output performances. The required dc-link capacitance is significantly reduced, making it possible to design high power density long lifetime cost effective power electronics systems. Moreover, the active series voltage compensator of the invention may be applied for extending a lifetime of an existing designed dc-link capacitor, therefore improving the whole system's life-cycle.

In a first main aspect, the invention provides a dc link module for a power circuit, comprising: an input for connecting to an output of a power conversion circuit; an output for connecting to a load circuit; a dc link capacitor arranged between said input and said output for processing a voltage signal received at said input; and a voltage compensation circuit arranged between said input and said output, said voltage compensation circuit adapted to generate a voltage signal to compensate an ac ripple component in a dc voltage signal appearing across the dc link capacitor.

Preferably, the voltage compensation circuit is adapted to process only the ac ripple component of the dc voltage signal. The voltage compensation circuit may be adapted to decouple the ac ripple component from the dc voltage signal prior to compensating said ac ripple component. The voltage compensation circuit may be adapted to generate a voltage signal that closely follows the ac ripple component of the dc voltage signal in order to compensate said ac ripple component of the dc voltage signal.

The voltage compensation circuit may be connected in series with the dc link module input or output. In one embodiment, the voltage compensation circuit comprises a linear voltage source. Preferably, however, the voltage compensation circuit comprises a switching converter.

In a second main aspect, the invention provides a voltage compensation circuit for a dc link in a power circuit which may comprise: a voltage source; an output filter; and a switching circuit arranged between said voltage source and said output filter, said switching circuit comprising active switching devices, wherein said voltage compensation circuit is adapted to generate a voltage signal to compensate an ac ripple component in a dc voltage signal appearing across the dc link capacitor. Preferably, the switching circuit comprises a full-bridge switching circuit, but it may in some embodiments comprise a combination of active switching devices and a plurality of diodes.

The voltage source may comprise any of: a single capacitor circuit; an external voltage source; or a winding coupling voltage source.

In a third main aspect, the invention provides a method of reducing the capacitance of a dc link in a power circuit, comprising the steps of: connecting an input of a dc link module to an output of a power conversion circuit; connecting an output of the dc link module to a load circuit; processing at a dc link capacitor arranged between said input and said output of said dc link module a voltage signal received at said input; and using a voltage compensation circuit arranged between said input and said output to generate a voltage signal to compensate an ac ripple component in a dc voltage signal appearing across the dc link capacitor.

In a fourth main aspect, the invention provides a controller for a dc link in a power circuit, comprising: means for sampling the dc link capacitor voltage signal; means for generating from said sampled dc link capacitor voltage signal a conditioned dc link capacitor voltage ripple signal; means for sensing an output voltage signal of a voltage compensation circuit; means for conditioning the sensed output voltage signal of the voltage compensation circuit; means for obtaining a dc offset signal from sensed output voltage signal of the voltage compensation circuit; means for compensating said conditioned dc link capacitor voltage ripple signal using the dc offset signal; means for obtaining drive signals for an active switching circuit of the voltage compensation circuit from said compensated and conditioned dc link capacitor voltage ripple signal.

Preferably, the means for generating from said sampled dc link capacitor voltage signal a conditioned dc link capacitor voltage ripple signal comprises a high pass filter.

The means for generating from said sampled dc link capacitor voltage signal a conditioned dc link capacitor voltage ripple signal may comprise a difference circuit which determines the difference between the sampled dc link capacitor voltage signal and the dc voltage signal appearing across the dc link capacitor.

The means for sensing an output voltage signal of the voltage compensation circuit and the means for conditioning the sensed output voltage signal of the voltage compensation circuit may both be comprised in a low pass filter circuit.

Preferably, the means for obtaining a dc offset signal comprises a proportional integrator.

Preferably also, the means for compensating said conditioned dc link capacitor voltage ripple signal using the dc offset signal comprises a subtractor circuit.

The means for obtaining drive signals may comprise a pulse wave modulator.

In a fifth main aspect, the invention provides a method of reducing the capacitance of a dc link in a power circuit, comprising the steps of: sampling the dc link capacitor voltage signal; generating from said sampled dc link capacitor voltage signal a conditioned dc link capacitor voltage ripple signal; sensing an output voltage signal of a voltage compensation circuit; conditioning the sensed output voltage signal of the voltage compensation circuit; obtaining a dc offset signal from sensed output voltage signal of the voltage compensation circuit; compensating said conditioned dc link capacitor voltage ripple signal using the dc offset signal; obtaining drive signals for an active switching circuit of the voltage compensation circuit from said compensated and conditioned dc link capacitor voltage ripple signal.

In a sixth main aspect, the invention provides a power conversion circuit including a dc link module according to the first main aspect of the invention or a voltage compensation circuit according to the second main aspect of the invention.

In accordance with a seventh aspect of the present invention, there is provided a dc link module for a power circuit, comprising:
  a first connector for connecting to a first power conversion circuit;
  a second connector for connecting to a second power conversion circuit, wherein the second power conversion circuit is connected to a load circuit arranged to at least intermittently operate as a power source to the power circuit;
  at least one dc link capacitors arranged between said first connector and said second connector for processing a voltage signal received at said first connector or said second connector; and
  at least one voltage compensation circuits arranged between said first connector and said second connector, said one or more voltage compensation circuits arranged to generate a voltage signal to compensate an ac ripple component in a dc voltage signal appearing across the at least one dc link capacitor.

In an embodiment of the seventh aspect, the at least one voltage compensation circuits is arranged to process only the ac ripple component of the dc voltage signal.

In an embodiment of the seventh aspect, the at least one voltage compensation circuits is arranged to decouple the ac ripple component from the dc voltage signal prior to compensating said ac ripple component.

In an embodiment of the seventh aspect, the at least one voltage compensation circuits is arranged to generate a voltage signal that closely follows the ac ripple component of the dc voltage signal in order to compensate said ac ripple component of the dc voltage signal.

In an embodiment of the seventh aspect, the at least one voltage compensation circuit is connected in series with the first connector or the second connector.

In an embodiment of the seventh aspect, the at least one voltage compensation circuit comprises a linear voltage source.

In an embodiment of the seventh aspect, the at least one voltage compensation circuit comprises a switching converter.

In an embodiment of the seventh aspect, the at least one voltage compensation circuit comprises:
a voltage source;
an output filter; and
a switching circuit arranged between said voltage source and said output filter, said switching circuit comprising active switching devices.

In an embodiment of the seventh aspect, the switching circuit comprises a full-bridge switching circuit.

In an embodiment of the seventh aspect, the switching circuit comprises a combination of active switching devices and a plurality of diodes.

In an embodiment of the seventh aspect, the voltage source comprises any of: a single capacitor circuit; an external voltage source; or a winding coupling voltage source.

In accordance with an eighth aspect of the present invention, there is provided a voltage compensation circuit for a dc link in a power circuit in accordance with an embodiment of the seventh aspect, comprising:
a voltage source;
an output filter; and
a switching circuit arranged between said voltage source and said output filter, said switching circuit comprising active switching devices;
wherein said voltage compensation circuit is arranged to generate a voltage signal to compensate an ac ripple component in a dc voltage signal appearing across the dc link capacitor.

In an embodiment of the eighth aspect, the switching circuit comprises a full-bridge switching circuit.

In an embodiment of the eighth aspect, the switching circuit comprises a combination of active switching devices and a plurality of diodes.

In an embodiment of the eighth aspect, the voltage source comprises any of a single capacitor circuit; an external voltage source; or a winding coupling voltage source.

In accordance with a ninth aspect of the present invention, there is provided a method of reducing the capacitance of a dc link in a power circuit comprising the steps of:
connecting a first connector of a dc link module to an output of a first power conversion circuit;
connecting a second connector of the dc link module to a second power conversion circuit, wherein the second power conversion circuit is connected to a load circuit arranged to at least intermittently operate as a power source to the power circuit;
using a dc link capacitor to process a voltage signal received at the first or second connector; and
using a voltage compensation circuit arranged between said input and said output to generate a voltage signal to compensate an ac ripple component in a dc voltage signal appearing across the dc link capacitor.

In accordance with a tenth aspect of the present invention, there is provided a controller for a dc link in a power circuit in accordance with any one of the embodiments of the seventh aspect, comprising:
means for sampling the dc link capacitor voltage signal;
means for generating from said sampled dc link capacitor voltage signal a conditioned dc link capacitor voltage ripple signal;
means for sensing an output voltage signal of a voltage compensation circuit;
means for conditioning the sensed output voltage signal of the voltage compensation circuit;
means for obtaining a dc offset signal from a sensed output voltage signal of the voltage compensation circuit;
means for compensating said conditioned dc link capacitor voltage ripple signal using the dc offset signal; and
means for obtaining drive signals for an active switching circuit of the voltage compensation circuit from said compensated and conditioned dc link capacitor voltage ripple signal.

In an embodiment of the tenth aspect, the means for generating from said sampled dc link capacitor voltage signal a conditioned dc link capacitor voltage ripple signal comprises a high pass filter.

In an embodiment of the tenth aspect, the means for generating from said sampled dc link capacitor voltage signal a conditioned dc link capacitor voltage ripple signal comprises a difference circuit which determines the difference between the sampled dc link capacitor voltage signal and the dc voltage signal appearing across the dc link capacitor.

In an embodiment of the tenth aspect, the means for sensing an output voltage signal of the voltage compensation circuit and the means for conditioning the sensed output voltage signal of the voltage compensation circuit are both comprised in a low pass filter circuit.

In an embodiment of the tenth aspect, the means for obtaining a dc offset signal comprises a proportional integrator.

In an embodiment of the tenth aspect, the means for compensating said conditioned dc link capacitor voltage ripple signal using the dc offset signal comprises a subtractor circuit.

In an embodiment of the tenth aspect, the means for obtaining drive signals comprises a pulse wave modulator.

In an embodiment of the tenth aspect, the controller further comprises a power flow direction circuit arranged to determine a direction of current flow between the first connector and the second connector.

In an embodiment of the tenth aspect, the power flow direction circuit is arranged to selectively operate the controller based on the direction of current flow between the first connector and the second connector.

In an embodiment of the tenth aspect, the power flow direction circuit is arranged to selectively operate a subtractor circuit.

In accordance with a eleventh aspect of the present invention, there is provided a method of reducing the capacitance of a dc link in a power circuit in accordance with any one of the embodiments of the seventh aspect, comprising the steps of:
sampling the dc link capacitor voltage signal;
generating from said sampled dc link capacitor voltage signal a conditioned dc link capacitor voltage ripple signal;
sensing an output voltage signal of the voltage compensation circuit;
conditioning the sensed output voltage signal of the voltage compensation circuit;
obtaining a dc offset signal from sensed output voltage signal of the voltage compensation circuit;
compensating said conditioned dc link capacitor voltage ripple signal using the dc offset signal;
obtaining drive signals for an active switching circuit of the dc link module from said compensated and conditioned dc link capacitor voltage ripple signal.

In accordance with a twelfth aspect of the present invention, there is provided a power conversion circuit including a dc link module of an embodiment of the seventh aspect or the voltage compensation circuit of eighth aspect.

In accordance with a thirteenth aspect of the present invention, there is provided a dc link module in accordance with claim 1, wherein the at least one voltage compensation circuit or the voltage compensation circuit of an embodiment of the eighth aspect is arranged to supplement electrical power for the power circuit.

In accordance with a fourteenth aspect of the present invention, there is provided a dc link module for a power condition circuit arranged to electrically connect a first power converter circuit to a second power converter circuit comprising:

A link capacitor arranged between the first power converter circuit and the second power converter circuit to processing a voltage signal received at a connection with the first power converter circuit or a connection with the second power converter circuit; and a voltage compensation module arranged to generate a voltage signal to compensate an ac ripple component in a dc voltage signal appearing across the link capacitor, wherein electric current is arranged to flow from the first power converter circuit to the second power converter circuit and at least intermittently, for the electric current to flow from the second power converter circuit to the first power converter circuit.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 3 is a schematic circuit diagram illustrating a voltage compensator circuit according to the invention;

FIG. 4A shows a preferred voltage source for the voltage compensator circuit of FIG. 3;

FIG. 4B shows a preferred voltage source for the voltage compensator circuit of FIG. 3;

FIG. 4C shows a preferred voltage source for the voltage compensator circuit of FIG. 3;

DESCRIPTION OF PREFERRED EMBODIMENTS

The following description is of a preferred embodiment by way of example only and without limitation to the combination of features necessary for carrying the invention into effect.

The present invention relates generally to circuits for reducing the capacitance requirement in capacitor-supported power electronic systems. More particularly, the invention relates to a series voltage compensator to reduce the dc-link capacitance in various power conversion systems. Thus, high-voltage aluminum electrolytic capacitors can be substituted by high-voltage power film capacitors of much smaller value.

Figure 2:
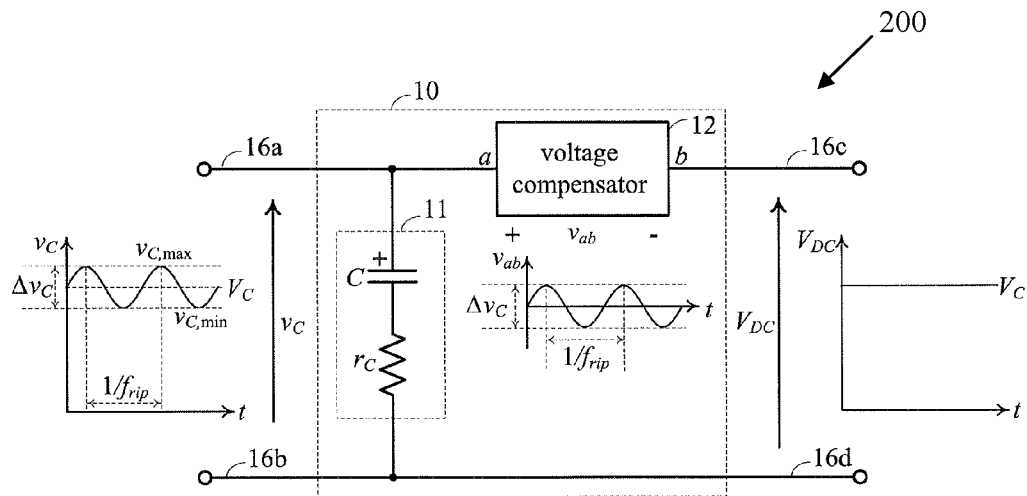
FIG. 2 is a schematic circuit diagram illustrating a dc link module with a series voltage compensator circuit according to the invention.

FIG. 2 illustrates the proposed basic concept of the dc link module of the invention. The input to the dc-link capacitor 11 comprising the dc bus lines 16a and 16b is connected to an output of a previous power conversion stage (not shown). Typically, the previous power conversion stage is a bridge rectifier or power factor corrector circuit, which generates a dc voltage containing an ac ripple component. As shown in FIG. 2, the capacitor voltage $v_C$ is composed of a dc component $V_C$ superimposed with a voltage ripple of $\Delta v_C$. To decouple these two signal parts, a voltage compensator circuit 12 is connected in series with a dc-bus line 16c to produce an ac voltage $v_{ab}$ that closely follows the ripple voltage $\Delta v_C$. Therefore, an ideal dc voltage $V_{DC}$ will appear at the dc link module output comprising the two terminals between the bus-lines 16c and 16d. Therefore, a much higher voltage ripple is allowed on the dc-link capacitor 11. The value of dc-link capacitance only depends on the designed maximum magnitude of $v_{ab}$, permitting the reduction of the value of the capacitor 11. The dc-link capacitor 11 together with the voltage compensator 12 forms a dc-link module 10 that can be applied in various dc-link capacitor-supported power electronic systems.

It should be noted that the waveform of the ac component $\Delta v_C$ does not necessitate being sinusoidal as shown in FIG. 2. It can be an arbitrary type of periodical signal with a frequency defined as $f_{rip}$. Accordingly, $v_{ab}$ is rendered to $\Delta v_C$. Although the voltage compensator 12 is preferred to be series-connected to bus line 16c, it may be connected with bus line 16d, dc-link capacitor 11, or even bus lines 16a and 16b in series.

The voltage compensator 12 is adapted to only handle reactive power. That is, it has no net energy flow. As the function of the voltage compensator is used to generate the required voltage to compensate the voltage ripple appearing across the dc-link capacitor 11, it should be noted that the voltage compensator 12 can be realized by using a linear voltage source or a switching converter. In order to reduce the power loss, a switching converter is preferred. In the following discussion, operation of a switching converter is given, but the same concept is applicable to a voltage compensator circuit comprising a linear voltage source.

Since $v_{ab}$ is much smaller than the dc-link voltage (i.e., $v_{ab} \ll V_{DC}$), the voltage and power ratings of the voltage compensator 12 are very small, leading to using a low-power converter to realize the ripple cancellation.

It can be seen therefore that the invention provides a dc link module for a power circuit. The dc link module comprises an input for connecting to an output of a power conversion circuit and an output for connecting to a load circuit. A dc link capacitor is arranged between said input and said output for processing a voltage signal received at said input and a voltage compensation circuit is arranged between said input and said output with said voltage compensation generating a voltage signal to compensate an ac ripple component in a dc voltage signal appearing across the dc link capacitor.

Description of Circuit Topology for the Voltage Compensator 12.

In a preferred embodiment as seen in FIG. 3, the voltage compensator 12 is a full-bridge structure composed of a voltage source 20, an active switching circuit 21 comprising, for example, MOSFETs $S_1$-$S_4$ with low voltage ratings (e.g., 60 V, 100 V) and an output filter. The H-bridge 21 shown in FIG. 3 can be applied for both applications with and without regenerate energy from the load to the source. For the applications which are not feasible to regenerate energy from load to source, two of the active switching devices, $S_1$ and $S_4$, or $S_2$ and $S_3$ are replaced by diodes. The active switching devices $S_1$-$S_4$ can be of any other type of switches with predefined voltage and current ratings.

The preferred embodiments of the voltage source 20 connected to the H-bridge 21 are illustrated in FIGS. 4a to c. As the voltage compensator 21 only handles reactive power to cancel die capacitor voltage ripple, it does not require real power supplied from the voltage source 20. For constant power load application, the variations of dc-link capacitor voltage and load current are in anti-phase. A single capacitor 20c as shown in FIG. 4(c) cannot ensure the stability of the voltage compensator. Therefore, a winding coupling method 20a or an external source 20b may be used to provide the voltage source 20. Under uncontrolled load conditions, like non-switching resistive or inductive loads, a single auxiliary capacitor $C_a$ 20c can be applied for the voltage source. In such a scenario, the voltage across $C_a$ 20c increases from zero at startup and then automatically reaches a steady-state value.

Thus, it can be seen that the invention provides voltage compensation circuit for the dc link module which may comprise: a voltage source; an output filter; and a switching circuit arranged between said voltage source and said output filter. The switching circuit may comprise active switching devices. Preferably, the switching circuit comprises a full-bridge switching circuit, but it may in some embodiments comprise a combination of active switching devices and a plurality of diodes.

Illustration of the Controller Implementation.

Figure 5:
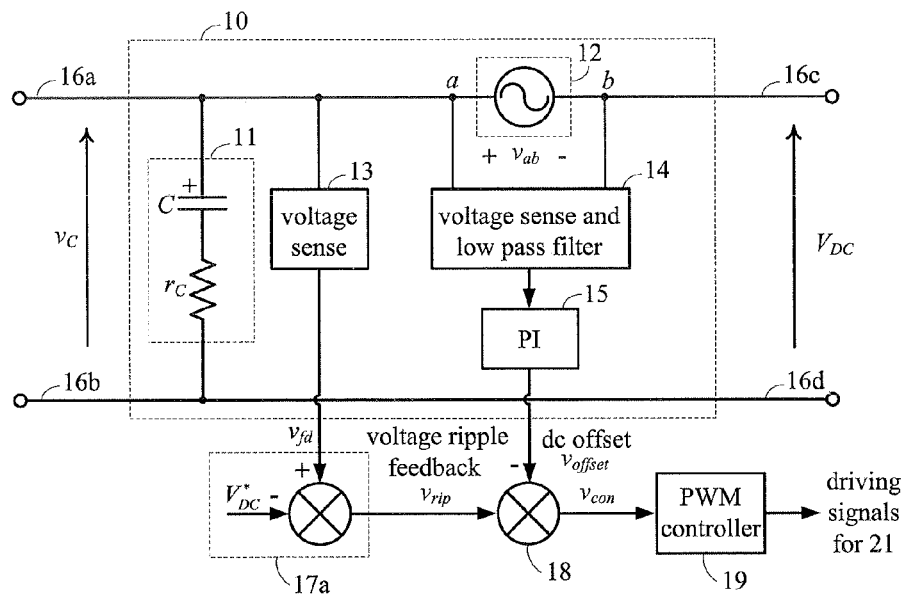
FIG. 5 is a schematic circuit diagram illustrating a circuit for a controller for the dc link module of the invention.
Figure 6:
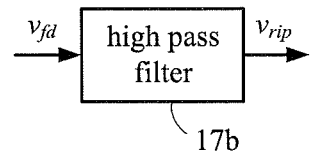
FIG. 6 is an alternative part of the circuit to that shown in FIG. 5 for obtaining the conditioned ripple voltage signal.
Figure 7:
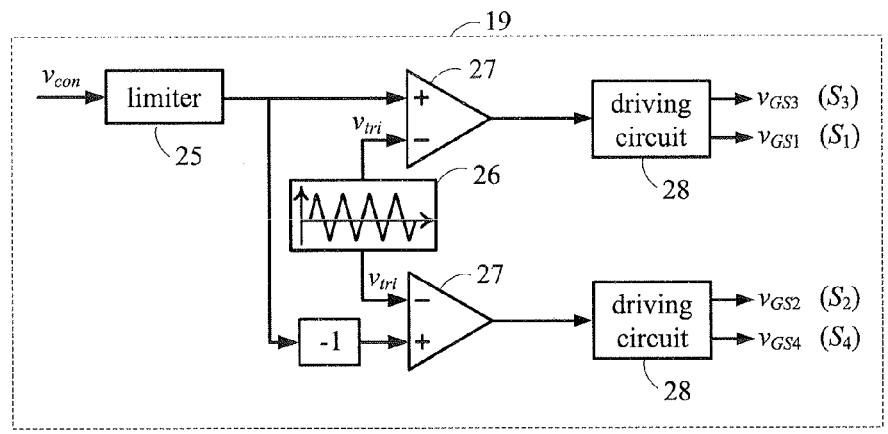
FIG. 7 a schematic circuit diagram illustrating a pulse width modulated (PWM) controller for the dc link controller of FIG. 5.

FIGS. 5 to 7 illustrate the detailed implementation of a controller for the voltage compensator. To ensure that $v_{ab}$ is tightly equal to $\Delta v_C$, the voltage ripple of the dc-link capacitor 11 is conditioned to be the control signal of a PWM controller 19. There are two preferred methods to obtain the conditioned capacitor voltage ripple $v_{rip}$. One method is to use the difference between the sampled dc-link capacitor voltage $v_{fd}$ and the dc-link voltage reference $V_{DC}^*$ as shown in 17a. Another way is to connect $y_{fd}$ to a high pass filter 17b to eliminate the dc component as presented in FIG. 6, resulting in only the voltage ripple. High pass filter 17b may induce a phase leading angle from the sampled $v_{rip}$ to the actual voltage ripple $\Delta v_C$, however, this angle is very small and its effect on the performance of the voltage compensator 21 is negligible for most practical applications.

A dc component may appear in $v_{ab}$ due to a variation of the steady-state voltage on the dc-link and non-ideal switching actions of the H-bridge switches. To eliminate this dc offset, the output voltage of the voltage compensator 12 is sensed and conditioned by a low pass filter 14. A proportional integral (PI) controller is added to obtain the dc offset signal $v_{offset}$. The voltage ripple signal $v_{rip}$ is compensated by $v_{offset}$ before entering into the PWM 19 controller through a subtractor 18. Therefore, the dc-offset is eliminated, allowing for the same dc voltage level as before to be outputted. Moreover, the voltage compensator 12 will not handle active power.

In a preferred embodiment, the PWM controller 19 is illustrated in FIG. 7. The control signal is first conditioned into a certain range by a voltage limiter 25, and then compared with a triangular signal 26 by a comparator 27. The driving circuit 28 provides two pairs of gate signals which are in anti-phase and with a predefined dead time. The whole PWM controller 19 may be implemented by ICs, discrete components or digital means. The magnitude of $v_{ab}$, $V_{ab}$, is approximately given by:

$$V_{ab} = \frac{V_{con}}{V_{tri}} V_a \qquad \text{(Equation 1)}$$

where $V_{con}$ is the magnitude of the control signal $v_{con}$, $V_{tri}$ is the magnitude of the triangular signal $v_{tri}$ and $V_a$ is the average steady-state value of the auxiliary capacitor voltage $v_a$. The frequency and phase of $v_{ab}$ are the same as those of $\Delta v_C$.

It should be noted that other types of controllers may be applied without departing from the scope of the present invention.

It can be seen therefore that the invention provides a controller for a dc link module as hereinbefore described and a method of reducing the capacitance of the dc link module where the method comprises the steps of: sampling the dc link capacitor voltage signal; generating from said sampled dc link capacitor voltage signal a conditioned dc link capacitor voltage ripple signal; sensing an output voltage signal of the voltage compensation circuit; conditioning the sensed output voltage signal of the voltage compensation circuit; obtaining a dc offset signal from sensed output voltage signal of the voltage compensation circuit; compensating said conditioned dc link capacitor voltage ripple signal using the dc offset signal; obtaining drive signals for an active switching circuit of the dc link module from said compensated and conditioned dc link capacitor voltage ripple signal.

Selection of the Dc-Link Capacitor and Auxiliary Capacitor.

Figure 8:
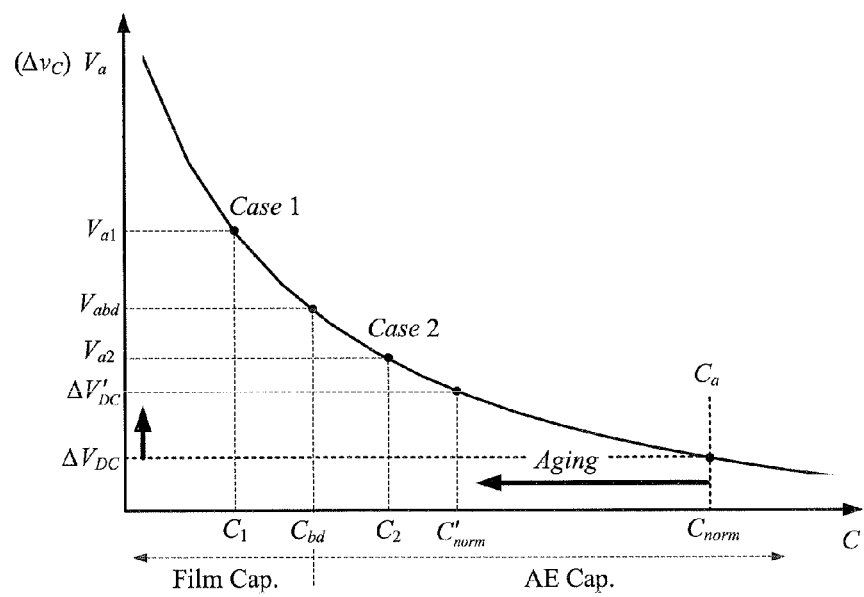
FIG. 8 comprises a $V_a$-C curve for design of a dc-link capacitor and an auxiliary capacitor of the dc link module.

The design considerations of for the dc-link capacitor C 11 and auxiliary capacitor $C_a$ 24 are illustrated in FIG. 8.

FIG. 8 comprises a $V_a$-C curve for design of dc-link capacitor and auxiliary capacitor under specified load power rating and dc-link voltage level ($V_a$-steady state dc component of the voltage across $C_a$ 24, $\Delta V_{DC}$-designed voltage ripple of the dc-link or the output of the proposed dc-link module 10, $C_{norm}$ required dc-link capacitance without proposed invention, $C_{norm}'$-dc-link capacitance after certain degree of aging, $\Delta V_{DC}'$-increased voltage ripple due to aging effect, $C_{bd}$-boundary of the selected type of dc-link capacitor according to specifications, availability, cost and volume, $V_{bd}$-value of $V_a$ corresponding to $C_{bd}$, Film Cap.-Film capacitor, AE Cap.-Aluminum electrolytic capacitor).

For a specified load power rating and dc-link voltage level, the minimum dc-link capacitance is $C_{norm}$ for achieving a desired voltage variation on the dc-link of $\Delta V_{DC}$ without the voltage compensation as provided by the present invention. Practically, the selected capacitance is usually larger than the value of $C_{norm}$ to meet the ripple current requirement. Due to the aging process of aluminum electrolytic capacitors, the capacitance $C_{norm}$ will decay with operation time as shown in FIG. 8, leading to an increasing voltage ripple to $\Delta V_{DC}'$, which is a crucial indicator of end of life of the capacitors.

With the presented invention, the design of the dc-link capacitance is no longer based on the specification of $\Delta V_{DC}$, but the designed dc voltage level of the auxiliary capacitor $C_a$ 24. A trade-off consideration is made to select the dc-link capacitance and limit the steady state voltage across $C_a$. According to specifications of the designed power electronic systems, availability, cost and volume of different type of capacitors, a boundary capacitance $C_{bd}$ can be determined as shown in FIG. 8. For instance, power film capacitors are applied in Case 1 shown in FIG. 8 with a higher level of $V_a$ compared to that of Case 2 in which aluminum electrolytic capacitors are selected. Ceramic capacitors may also be used for the dc-link filter. With the aid of the proposed voltage compensator, the required dc-link capacitance is significantly reduced, making it possible to achieve long life time power electronic systems (i.e., by using power film capacitors) as well as maintaining high power density and comparably low cost.

Furthermore, the present invention provides another advantage in that, even if the existing dc link capacitor is not changed, the use of the voltage compensator of the invention in an existing system can extend the lifetime of the system because the method of the invention allows a significant reduction of the dc-link capacitance. For example, if the electrolytic capacitance value for the system is originally 1000 mF and its value is reduced to the operation margin, say 800 mF, after three years, the capacitor has to be replaced. With the voltage compensator of the invention, the system can still be operated even if the e-cap is reduced to a much lower value than 800 mF. In other words, the lifetime of the system is extended without changing the type of the dc link capacitor.

In the present invention, the ideal case is that $v_{ab}$ exactly follows the voltage ripple of the dc-link capacitor C. However, when the H-bridge 21 is operating, the auxiliary capacitor $C_a$ is charged or discharged by the dc-bus 16c current (input current of the load stage). Therefore, a voltage ripple $\Delta v_{Ca}$ is generated on $C_a$ with the same frequency as that of the voltage ripple of C. This voltage ripple will induce an ac component with doubled frequency in $v_{ab}$, thus, a voltage variation of the output of the proposed dc-link module.

Therefore, the design of $C_a$ is based on the voltage ripple limitation of $\Delta V_{DC}$. For power electronic systems with a front-end stage of a boost PFC or PWM rectifier, and a load stage of a switch-mode dc-dc converter or a high-frequency output ac inverter, the maximum possible ripple of the proposed dc-link module can be limited within $\Delta V_{DC}$ if the value of $C_a$ is the same as that of $C_{norm}$. It implies that the present invention can maintain the same voltage ripple on the dc-link by using much lower voltage rating capacitors with the same capacitance as those dc-link capacitors used previously without the present invention. With other applications, the required value of $C_a$ may lower or higher than $C_{norm}$ as shown in FIG. 8.

The present invention may be utilized for extending the lifetime of the dc-link capacitor in an existing power electronic system. As illustrated in FIG. 8, the voltage ripple can be still kept at low levels rather than increasing to $\Delta V_{DC}'$ with the proposed voltage compensator even if the dc-link capacitance drops to $C_{norm}'$.

Figure 9:
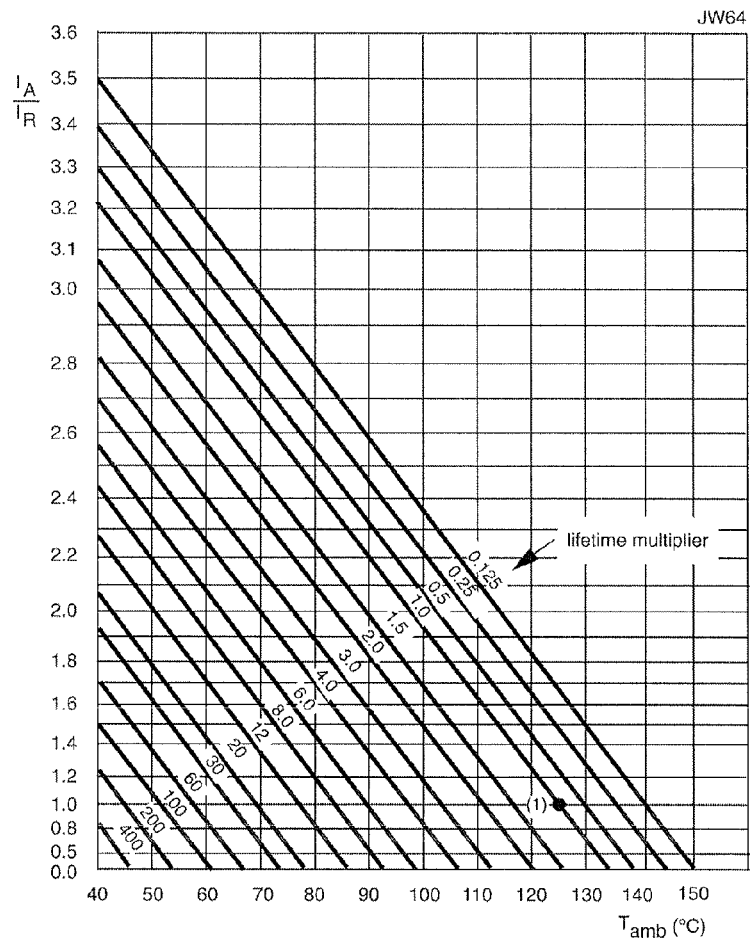
FIG. 9 is a graph showing a life time multiplier for an electrolytic capacitor.

As hereinbefore described, the auxiliary capacitor $C_a$ withstands only the voltage ripple of the dc-link capacitor. According to availability, cost and volumetric efficiency, the capacitors used for $C_a$ may be as follows:

1) High temperature high ripple current long lifetime aluminum electrolytic capacitors. High performance low voltage rating aluminum electrolytic capacitors are available for comparable low cost. Unlike the ones with high voltage ratings, they exhibit very good performance in terms of lifetime, nominal temperature and cost. For example, as shown in FIG. 9, the lifetime of the capacitors can be easily extended to the ranges that power film capacitors have.
2) Ceramic capacitors. $C_a$ can be implemented by ceramic capacitor tank with high volumetric efficiency.
3) Tantalum capacitors. Tantalum capacitors have high volumetric efficiency and long lifetime, however, high cost. They may be employed in some applications for $C_a$.
4) Any other type of capacitors which are suitable for the auxiliary capacitor $C_a$.

Figure 10:
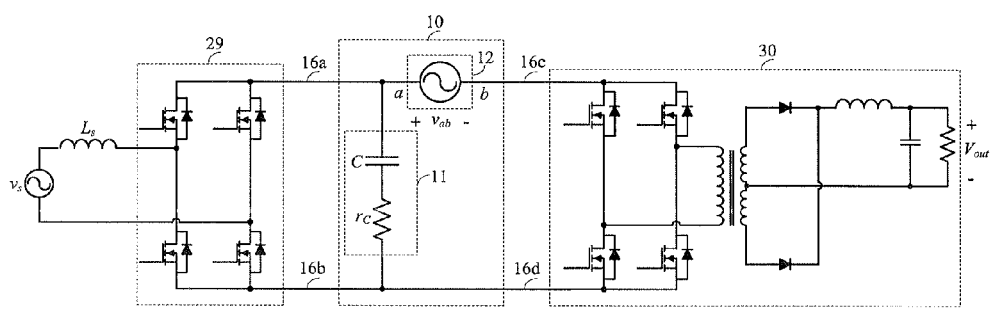
FIG. 10 is a schematic circuit diagram of an AC-DC-DC power conversion system with a front-end stage of a single-phase full-bridge PWM rectifier.

FIG. 10 presents an AC-DC-DC power conversion system with a front-end stage of a single-phase full-bridge PWM rectifier 29 and a load stage of a full-bridge dc-dc converter 30. The line frequency is 50 Hz. Table II compares the design of the dc-link part with and without the proposed voltage compensator 12 of the invention. The nominal output load power is 2 kW and dc-link voltage level is 800 V.

Figure 11:
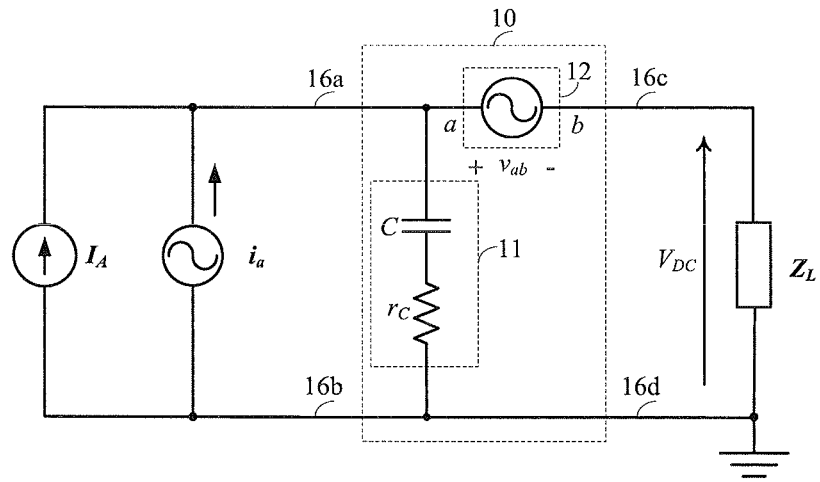
FIG. 11 is a schematic circuit diagram of a dc-link system according to the invention for preliminary experimental verification purposes.
Figure 12:
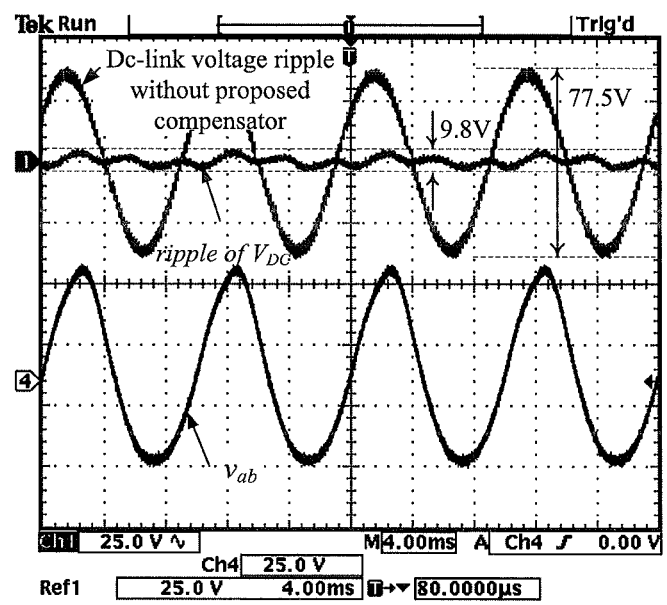
FIG. 12 shows the experimental results achieved with the circuit of FIG. 11 with and without the voltage compensator of the invention and with the same value of dc-link capacitances in each case.

FIG. 11 presents a 2 kW 400 V dc-link system for a preliminary experimental verification of the proposed invention. The input of the dc-link module 10 is connected to a dc current source $I_A$ which contains an ac current ripple $i_a$. $I_A$=5 A and the magnitude of $i_a$ is 1 A. The load $Z_L$=80+j0.063Ω. A 450 V/40 µF film capacitor is applied for the dc-link filter 11. A 50 V/1000 µF long life time aluminum electrolytic capacitor is used for the auxiliary capacitor $C_a$ in the voltage compensator 12. FIG. 12 shows the experimental results with and without the proposed voltage compensator with same value of dc-link capacitances. It can be seen that the output voltage ripple of the dc-link module is reduced from 77.5 V to 9.8 V with the proposed technique.

In general, the invention provides a dc link module for a power circuit. The dc link module comprises a dc link capacitor for processing a voltage signal from a power circuit. The module includes a voltage compensation circuit adapted to generate a voltage signal to compensate an ac ripple component in a dc voltage signal appearing across the dc link capacitor. The voltage compensation circuit is arranged to decouple the ac ripple component from the dc voltage signal and to only process the ac ripple component. This enables the dc link module capacitance to be substantially less than it would otherwise be.

In an alternative embodiment of a dc link module, the dc link module may be implemented or arranged to operate with a bi-directional power flow circuit. A bi-directional power flow circuit may include, for example, a power conversion circuit wherein electric current may flow from a power source to a power load and, at least at intermittent intervals, the power load is arranged to generate electric power. This electric power may be transmitted back from the power load to the power source through the conversion circuit.

Examples of bi-directional power flow applications where the power load may generate electric current for transmission back into the power conversion circuit includes applications of power conversation circuits for electric vehicles, lifts or funicular railways systems where the power load, such as an electric motor, may consume electrical power during motoring operation, but during the generating operation, the electric motor may also generate electric current. Examples of applications which would have this effect may include regenerative braking systems of electric vehicles or electric lifts.

Figure 1:
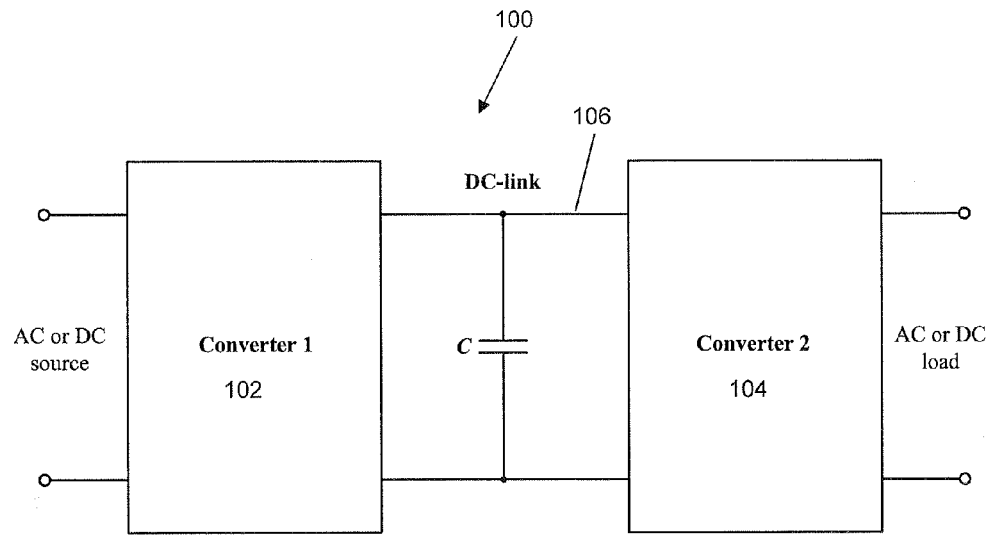
FIG. 1 is a schematic diagram of a typical power conversion system or circuit.

To operate with these bi-directional power flow applications, example embodiments of the power conversion circuit may be arranged with a bi-directional dc link module, or a dc link module which is able to operate in a bi-directional manner so as to process the electric energy which flows from the power source to the power load as well as the energy from the power source to the power load. With reference to the power conversion circuit shown in FIG. 1, should this power conversion circuit be subjected to a bi-directional application, the power conversion circuit would be arranged so that electric energy flows from the first converter 102, through a dc link to a second converter 104.

However, during certain operations of the bi-directional application, such as during a regenerative braking phase, electric energy may flow from the second converter 104 to the first converter 102. In these instances, to process the electric current in a bi-directional application, the dc link may need to be modified or arranged so as to process the electric current from both the power source and the power load.

Figure 13A:
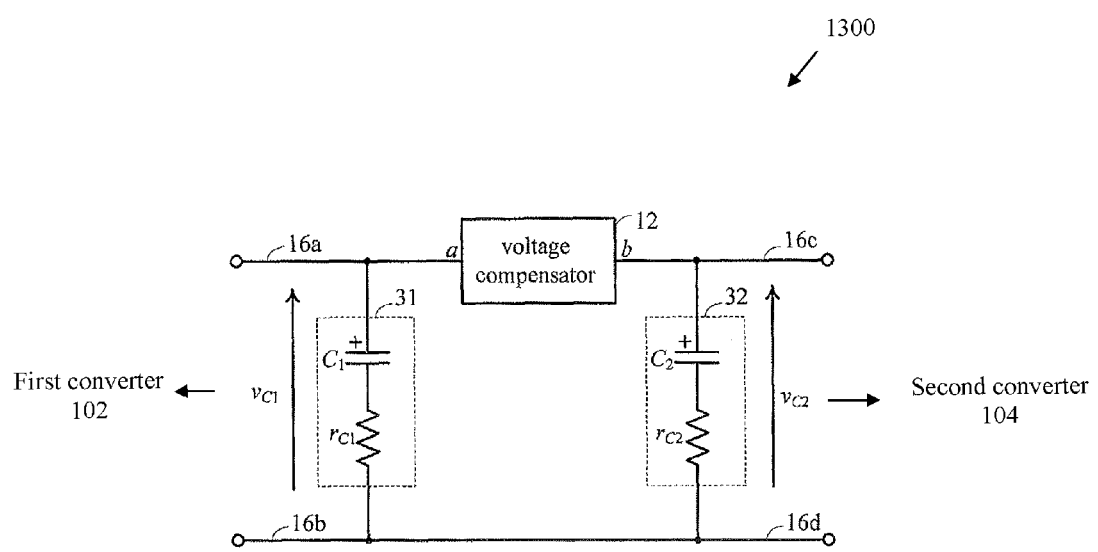
FIG. 13A is a schematic circuit diagram illustrating a dc link module with a series voltage compensator circuit in according with another embodiment of the invention.
Figure 14A:
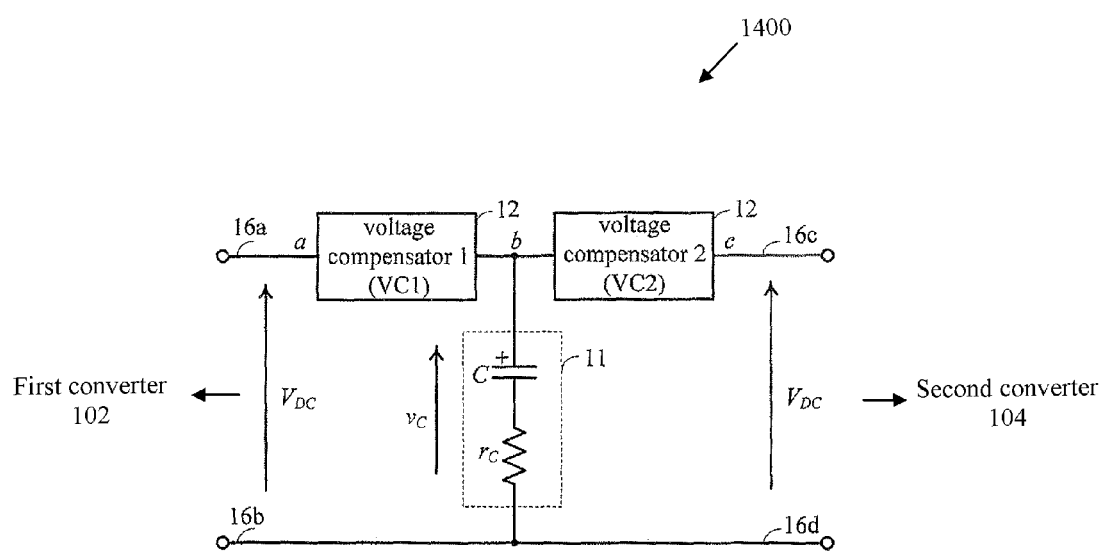
FIG. 14A is a schematic circuit diagram illustrating a dc link module with a series voltage compensator circuit in according with another embodiment of the invention.

With reference to FIGS. 13A and 14A, there is illustrated an alternative embodiment of the dc link module which is arranged to operate for a bi-directional power circuit by providing a smooth dc voltage for the second converter 104 when the electric energy is transferred from the first converter 102 to the second converter 104 and vice-versa when electric energy flows in the opposite direction.

In one embodiment, the dc link module for a bi-directional power circuit comprises a first connector 16a and 16b for connecting to a first power converter or first conversion circuit 102; a second connector 16c and 16d for connecting to a second power converter or second power conversion circuit 104, wherein the second power conversion circuit 104 is connected to a load circuit arranged to at least intermittently operate as a power source to the power circuit; at least one dc link capacitors arranged between said first connector 16a and 16b and said second connector 16c and 16d for processing a voltage signal received at said first connector or said second connector; and at least one voltage compensation circuits arranged between said first connector and said second connector, said one or more voltage compensation circuits arranged to generate a voltage signal to compensate an ac ripple component in a dc voltage signal appearing across the at least one dc link capacitor.

As shown in FIG. 13A, there is illustrated a wiring diagram of an example embodiment of a dc link module for a bi-directional power circuit comprising two dc link capacitors 31 & 32. In this example, when electric energy is transferred from the first converter 102 to the second converter 104, the capacitor $C_1$ and the voltage compensator 12, which may be similar to voltage compensator 12 described above, form a dc link module that gives smooth dc voltage at the terminals 16c and 16d of the second converter 104. In this example, the capacitor $C_2$ may also assist in reducing the voltage ripple.

However, when electric energy is transferred from the second converter 104 to the first converter 102, such as when the power load is generating electricity, the capacitor $C_2$ and the voltage compensator 12 in turn form the aforesaid dc link module to provide a smooth dc voltage at the terminals of the first converter 102 (16a and 16b). In a similar manner, $C_1$ may also assist in reducing the ripple voltage at the terminals of the first converter.

Figure 13B:
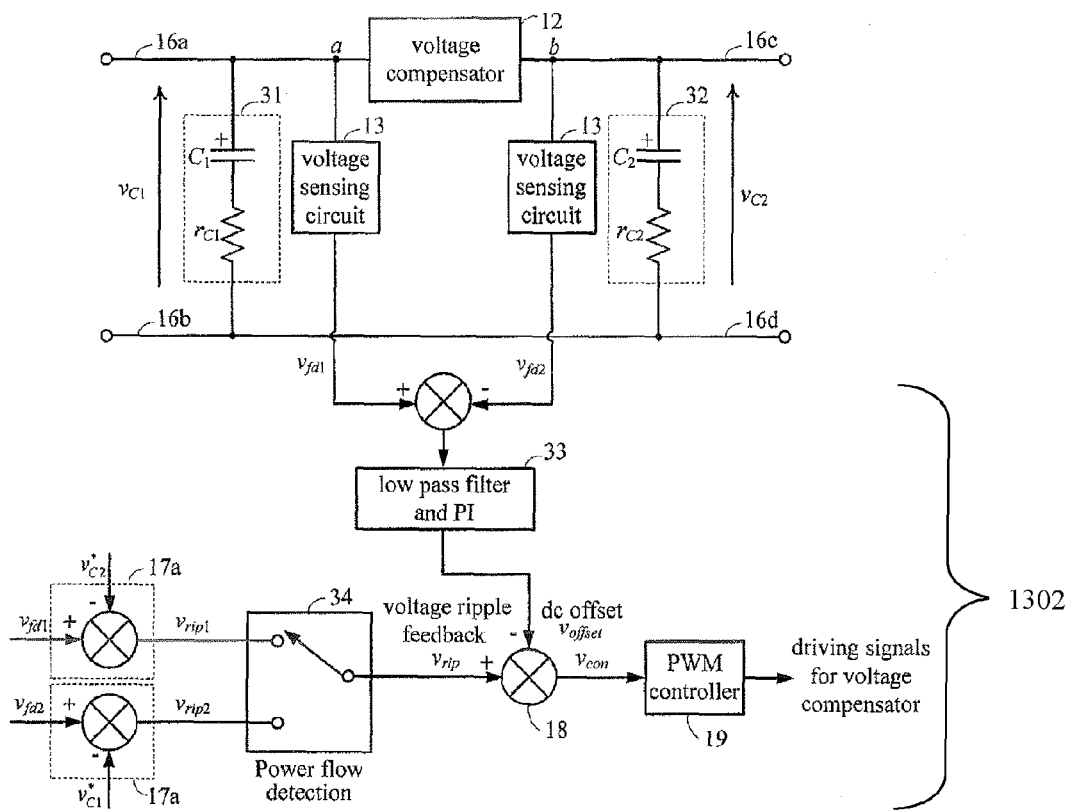
FIG. 13B is a schematic circuit and block diagram illustrating a controller for the dc link module illustrated in FIG. 13A.

With reference to FIG. 13B, a controller 1302 implemented with an example of a control method is illustrated as a block diagram. The controller 1302 is arranged to control the dc link module described above with reference to FIG. 13A. In this embodiment, the voltage of the dc link is measured or sensed by a sampling module 13, which may be similar to the voltage sensing circuit described previously. The sampling module 13 may also be arranged to detect the ripple voltage and measured the ripple voltage so as to provide the voltage compensator 12 with sufficient information to generate a required ripple voltage to counter these ripple voltage.

As illustrated in the block diagram of the control method in FIG. 13B. There are two sensing points which are at two nodes "a" & "b". Once electric energy is transferred from the first converter 102 to the second converter 104, the ripple voltage generated by the voltage compensator is based on the voltage sensed at node "a", which in turn causes the ripple voltage at node "b" to be reduced. Conversely, when the energy is transferred from the second converter 104 to the first converter 102, the ripple voltage generated by the voltage compensator is based on the voltage sensed at node "b", in order to reduce the ripple voltage at node "a". Accordingly, the voltage ripple feedback signal $V_{rip}$ is either $V_{rip1}$ or $V_{rip2}$, dependent on the direction in which power is flowing through the dc link, which can be detected by the power flow detection circuit 34.

Figure 14B:
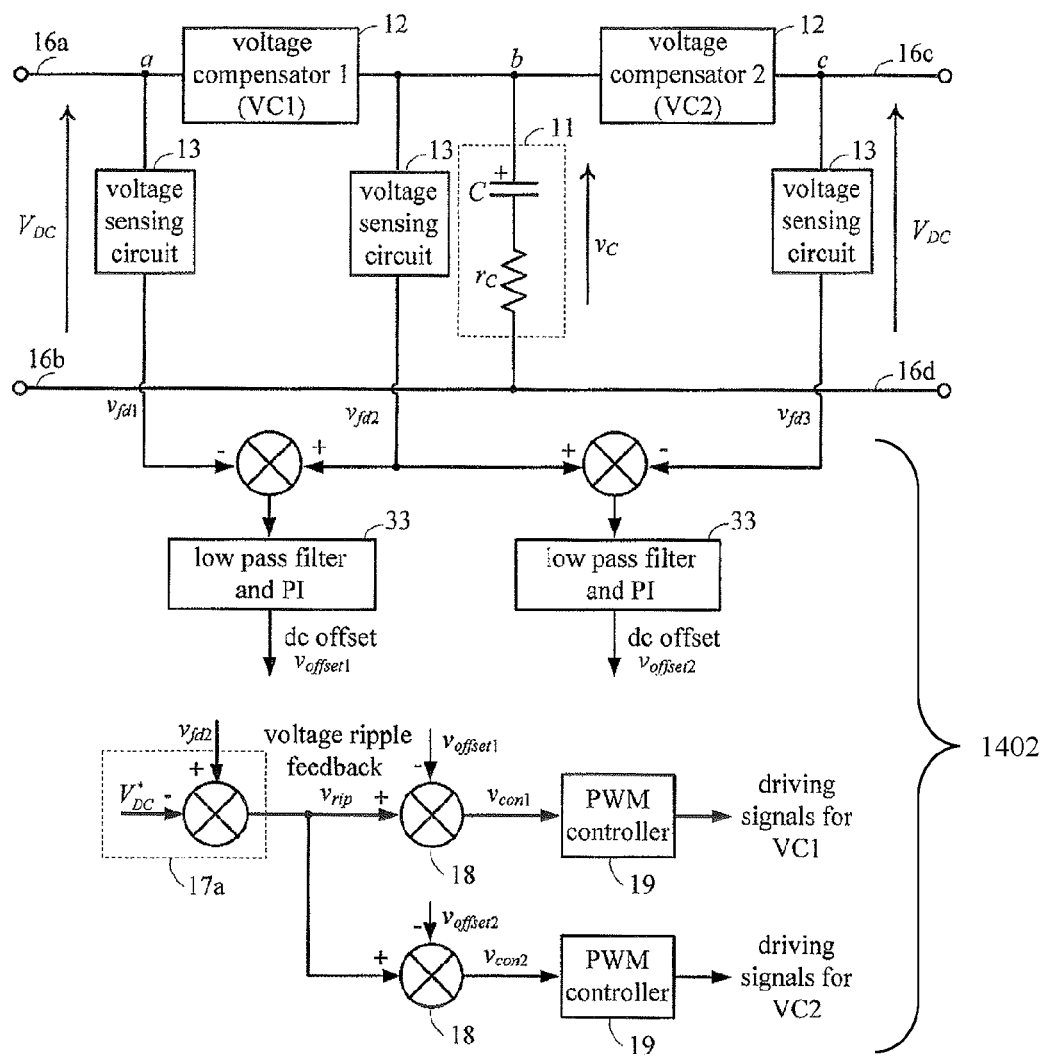
FIG. 14B is a schematic circuit and block diagram illustrating a controller for the dc link module illustrated in FIG. 14A.

With reference to FIG. 14A and FIG. 14B, there is illustrated another embodiment of a dc link for a bi-directional power circuit. In this embodiment, the dc link includes one capacitor C (11) and two series voltage compensators 12, VC1 and VC2, which may be similar to the voltage compensators 12 described earlier. However, as shown in the wiring diagram of FIG. 14A, in this example, the voltage compensators 12, VC1 and VC2 may operate as both dc/ac converters.

In this example, the dc link capacitor C comprises a dc component $V_c$ and an ac component of $\Delta v_C$. In operation, VC1 and VC2 will generate ripple voltages $\Delta v_1$ and $\Delta v_2$ respectively. These generated ripple voltages will effectively cancel the ripple voltages which appear at the terminals of the first converter 102 (16a & 16b) and the second converter 104 (16c & 16d). That is, $\Delta v_1$ is of the same magnitude and in the phase with $\Delta v_C$ (Mathematically, $\Delta v_1 = \Delta v_C$). Thus, the terminal voltage of the first converter 102 (at 16a & 16b) is purely dc (i.e without any significant ac ripple voltages). Similarly, that is, $\Delta v_2$, is of the same magnitude and in phase with $\Delta v_C$ (Mathematically, $\Delta v_2 = \Delta v_C$). Thus, the terminal voltage of the second converter 104 (at 16c & 16d) is also purely dc.

With reference to FIG. 14B, an embodiment of a controller 1402 is illustrated in a block diagram. In this example embodiment, methods used by the controller 1402 to control the voltage compensators 12, VC1 and VC2 will be identical. In operation, the controller 1402 firstly measures the dc link capacitor voltage with a sampling module 13 and extracts the ripple voltage component from the measurements. Once these ripple voltage values are known, the values are provided to VC1 and VC2 so as to generate the required rippled voltage. As shown in FIG. 14B, the dc link voltage $V_c$ is measured by a sampling module 13 and then conditioned to obtain its ac component of the feedback signal, $V_{rip}$. Once $V_c$ is known, to eliminate any dc component that may appear in the output voltages of VC1 and VC2, the output voltages of VC1 and VC2 are sensed and conditioned by a low pass filter 33. Proportional Integral (PI) controllers 19 are added to obtain the dc offset signals $V_{offset1}$ and $V_{offset2}$.

In this embodiment, the voltage ripple signal $V_{rip}$ is compensated by $V_{offset1}$ and $V_{offset2}$ before entering into the PWM controllers for VC1 and VC2, respectively. Therefore, dc-offsets are eliminated, allowing for the same dc voltage level at nodes 'a', 'b' and 'c'.

These embodiments are advantageous in that the dc link module allows a bi-directional power flow circuit to make the voltages at the terminals of first converter 102 and the second converter 104 to a very low ripple voltage.

Figure 15A:
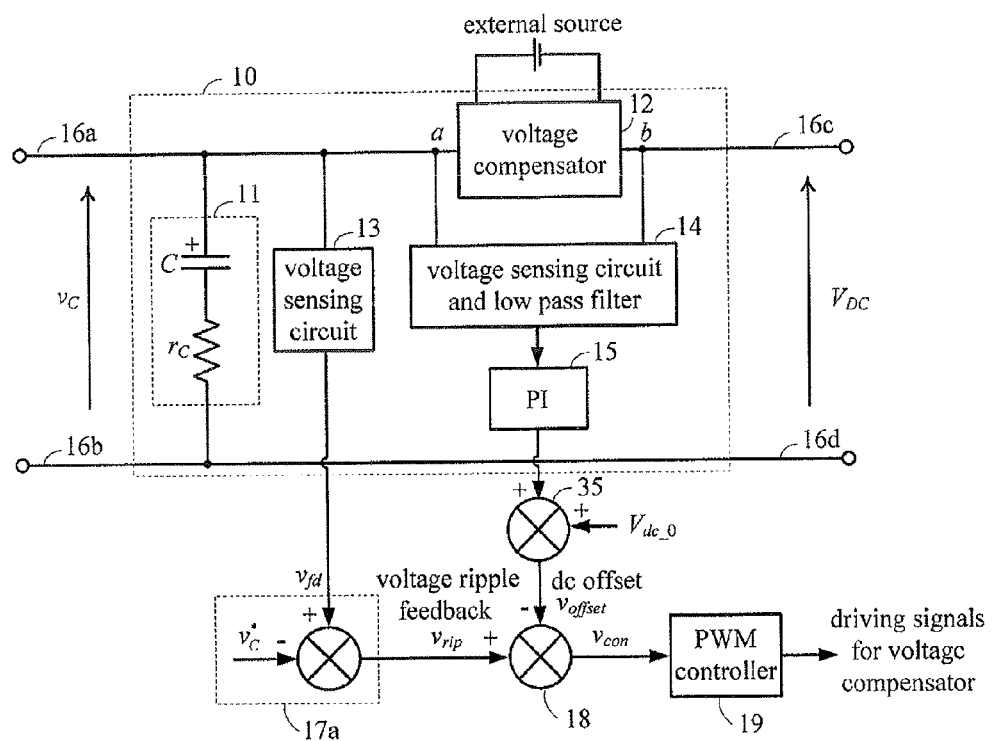
FIG. 15A is a schematic circuit diagram illustrating a dc link module of FIG. 2 being arranged to handle active power.
Figure 15B:
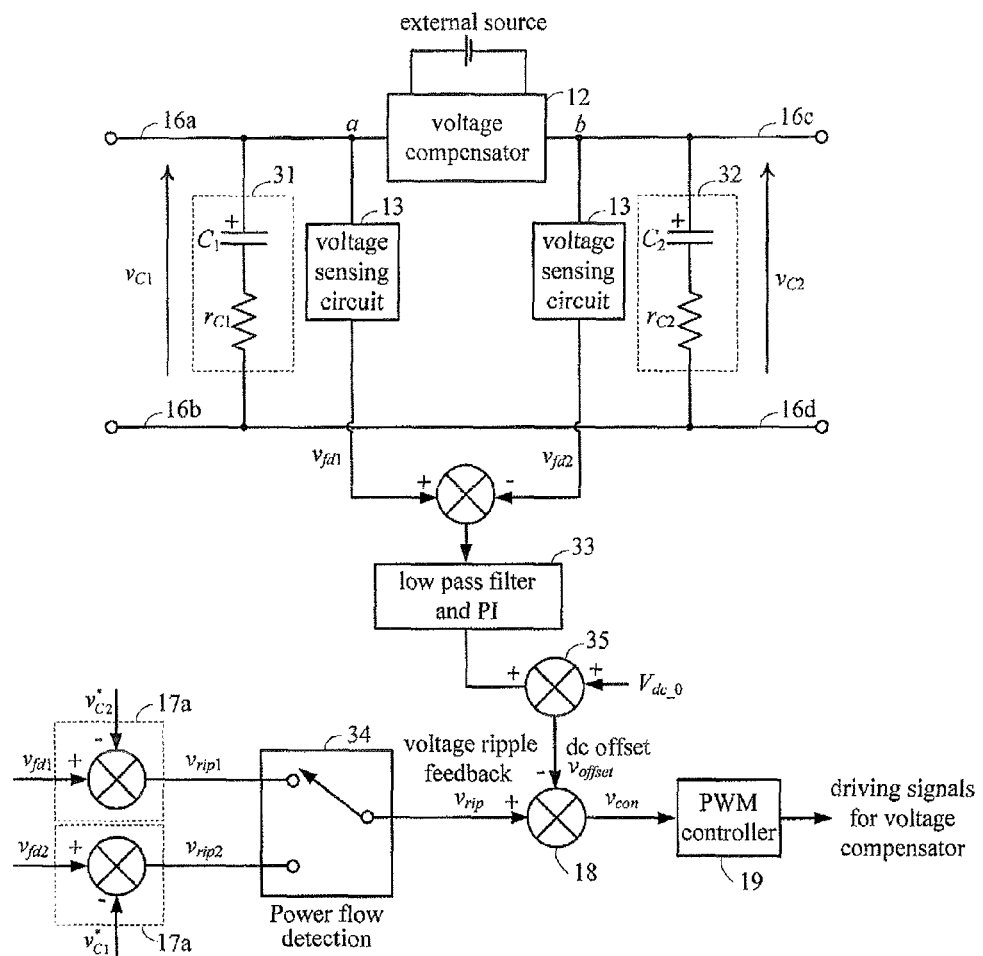
FIG. 15B is a schematic circuit diagram illustrating a dc link module of FIG. 13A being arranged to handle active power.

With reference to FIGS. 15A and 15B, there is illustrated an embodiment of a controller arranged to control embodiments of dc link as shown in FIGS. 2, 13A and 14A so that the dc link 200, 1300 & 1400 is arranged to handle active power. This in turn allows the voltage compensator 12 to act as an energy source or energy sink.

In one example, to handle active power, if the output voltage $V_{ab}$ of the VC has a dc voltage $V_{ab}$, the polarity of $V_{ab}$ determines the function of the VC. If $V_{ab}$ is negative, the VC acts as an energy source because the VC will deliver energy to $V_{dc}$. Conversely, if $V_{ab}$ is positive, the VC acts as an energy source because the VC will absorb energy from $V_{dc}$. The dc side of the VC is connected to a dc source.

In this embodiment, the circuit structure of the dc link 200, 1300 & 1400 may not require any circuit modifications. However, the arrangement of these dc links 200, 1300 & 1400 may be arranged to handle active power by modification of or adapting the controller and its control method as illustrated in FIGS. 5, 13B & 14B.

Figure 15C:
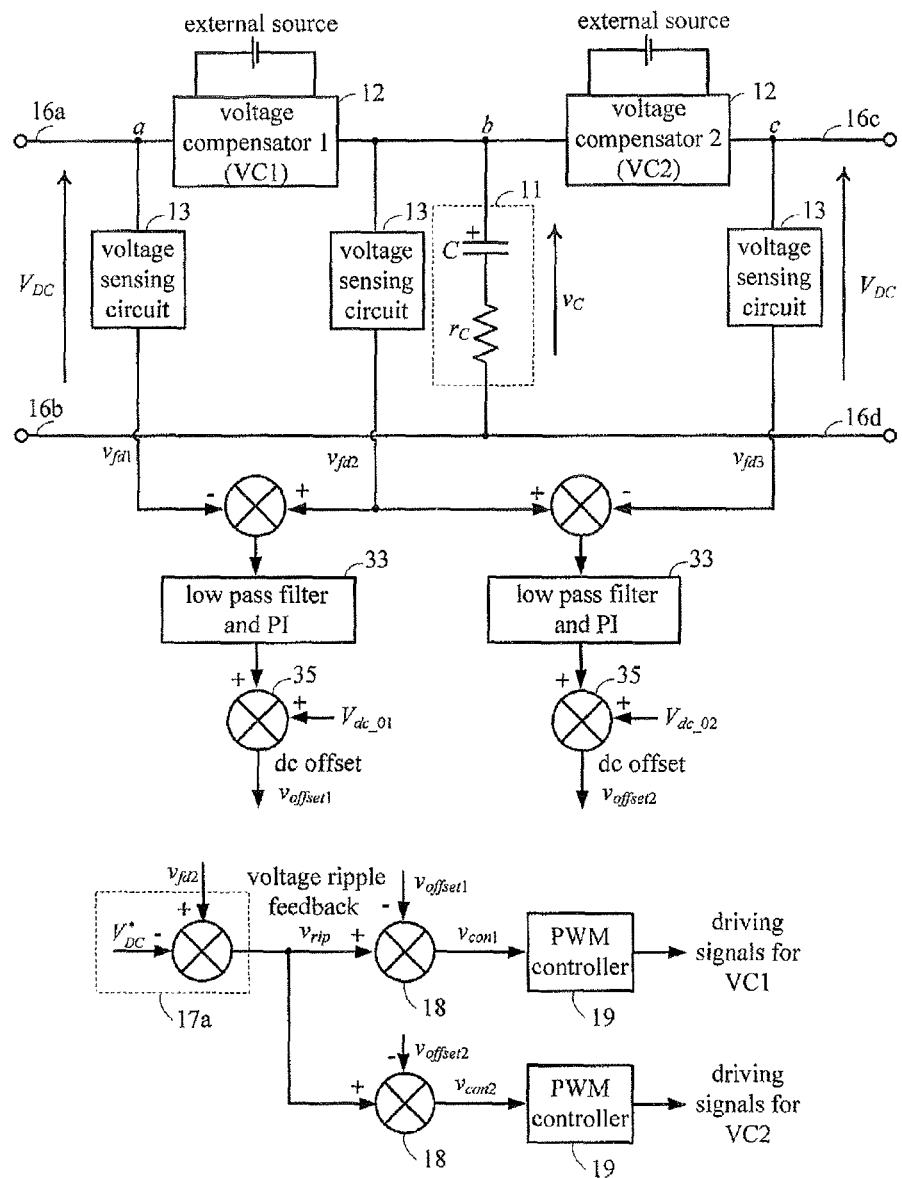
FIG. 15C is a schematic circuit diagram illustrating a dc link module of FIG. 13B being arranged to handle active power; and, FIG. 16 is a schematic circuit diagram illustrating a dc link module of 13A being used in a bi-directional power conversion circuit.

In one example, a modification of the feedback path for dc offset cancellation can determine the output dc component of the $V_c$. As shown in FIGS. 15A, 15B and 15C, in which the control voltage $V_{dc\_o}$ can control the output dc voltage. FIGS. 15A-15C present three corresponding typical configurations of the dc-link module with active power flow. With reference to the embodiments illustrated in FIGS. 15A and 15B, the control voltage $V_{dc\_o}$ is added to the dc component of the output voltage of VC by a summation circuit 35. The generation of the control voltage $V_{dc\_o}$ is application dependent. When $V_{dc\_a}$ is equal to zero, the VC handles reactive power only as normal. However, when $V_{dc\_o}$ is not equal to zero, a dc component appears in the control signal $V_{con}$ inducing a dc offset in the VC output voltage. Therefore, the VC can provide the desired active energy required by the main power conversion system.

With reference to FIG. 15C, the active power control method is similar to those in illustrated with reference to FIGS. 15A and 15B, except that there are two control voltages $V_{dc\_o1}$ and $V_{dc\_o2}$, which are used to control the active power in VC1 and VC2, respectively.

These embodiments of controllers are advantageous in that the dynamic response of the entire capacitor-supported system is improved. As the voltage compensator 12 acts as a power source or power sink that can provide or extract energy from the entire capacitor-supported system quickly, the input and output power within the power conversion circuit can be balance in a short period of time. This will in turn shorten the settling time during supply or load disturbance experienced during use of the power conversion circuit.

EXAMPLE

Figure 16:
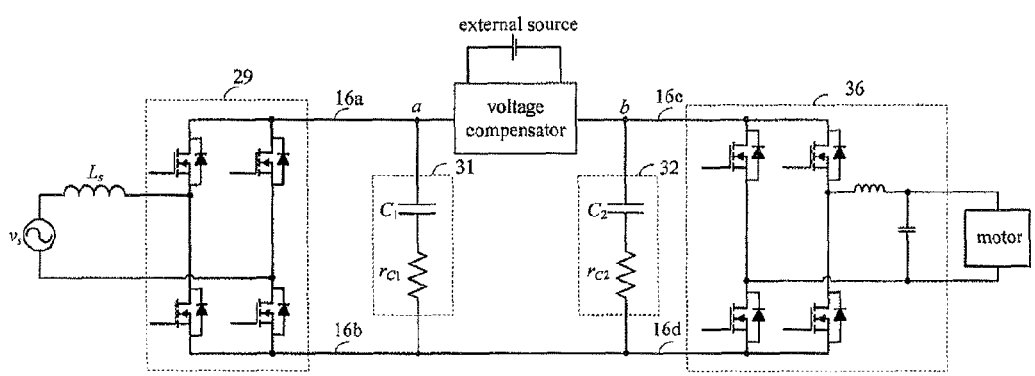

With reference to FIG. 16, there is illustrated a wiring diagram of an example operation of a dc link 1600 for a bi-directional power circuit. In this example, the first converter 29 is an ac/dc rectifier and the second converter 36 is a dc/ac motor drive. During operation of the motor drive, if the operating mode of the motor drive is changed from the motoring mode (normal forward operation) into regenerative mode (braking), such as during regenerative braking, the mechanical energy stored in the motor-driven component is converted by the dc/ac motor drive into electric energy.

This electric energy is in turn transferred from the second converter 36 to the first converter 29. Since the first converter 29 may be of a slow-response type, it cannot transfer the regenerated energy from the second converter 36 to the power supply side (e.g. a battery) of the first converter 29 in a short period of time. This results in that the dc link voltage will increase significantly.

In order to avoid overvoltage in the dc link, the dc link may comprise a plurality of capacitors in order to absorb the regenerated power. Thus, with the proposed active power control in the voltage compensator (VC), the VC can absorb the power regenerated from the second converter 36 so as to keep the dc link voltage relatively constant during the regenerative mode of the motor drive.

In addition, these embodiments are also advantageous in that the hold-up time of the system can be controlled. Since the voltage compensator VC can act as an energy source, it can also deliver energy and maintain the voltage of $V_{dc}$ during the supply outage.

In another embodiment, the dc link module may also have the active power control included, so that the voltages at the first and second converter can both have high quality dc voltage as well as power flow control.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A dc link for a power circuit, comprising:
   a first connector for connecting to an output of a first power conversion circuit;
   a second connector for connecting to an input of a second power conversion circuit, wherein the second power conversion circuit is connected to a load circuit arranged to at least intermittently operate as a power source to the power circuit;
   at least one dc link capacitor arranged between said first connector and said second connector for processing a voltage signal received at said first connector or said second connector;
   at least one voltage compensation circuit arranged between said first connector and said second connector and in connection with the at least one dc link capacitor, said one or more voltage compensation circuits arranged to generate a voltage signal to counter an ac ripple component in a dc voltage signal appearing across the at least one dc link capacitor, so as to provide a smooth dc voltage signal to the second power conversion circuit, wherein a combination of the at least one dc link capacitor and the at least one voltage compensation circuit is connected to the first connector and the second connector via a plurality of dc bus lines; and
   a controller comprising:
      means for sampling the dc link capacitor voltage signal;
      means for generating from said sampled dc link capacitor voltage signal a conditioned dc link capacitor voltage ripple signal;
      means for sensing a voltage signal of the voltage compensation circuit;
      means for conditioning the sensed voltage signal of the voltage compensation circuit;
      means for obtaining a dc offset signal from the sensed voltage signal of the voltage compensation circuit;
      means for compensating said conditioned dc link capacitor voltage ripple signal using the dc offset signal; and
      means for obtaining drive signals for an active switching circuit of the voltage compensation circuit from said compensated and said conditioned dc link capacitor voltage ripple signal.

2. The controller of claim 1, wherein the means for generating from said sampled dc link capacitor voltage signal the conditioned dc link capacitor voltage ripple signal comprises a high pass filter.

3. The controller of claim 1, wherein the means for generating from said sampled dc link capacitor voltage signal said conditioned dc link capacitor voltage ripple signal comprises a difference circuit which determines a difference between the sampled dc link capacitor voltage signal and the dc voltage signal appearing across the at least one dc link capacitor.

4. The controller of claim 1, wherein the means for sensing the voltage signal of the voltage compensation circuit and the means for conditioning the sensed voltage signal of the voltage compensation circuit are both comprised in a low pass filter circuit.

5. The controller of claim 1, wherein the means for obtaining the dc offset signal comprises a proportional integrator.

6. The controller of claim 1, wherein the means for compensating said conditioned dc link capacitor voltage ripple signal using the dc offset signal comprises a subtractor circuit.

7. The controller of claim 1, wherein the means for obtaining the drive signals comprises a pulse wave modulator.

8. The controller of claim 1, further comprising a power flow direction circuit arranged to determine a direction of current flow between the first connector and the second connector.

9. The controller of claim 8, wherein the power flow direction circuit is arranged to selectively operate the controller based on the direction of current flow between the first connector and the second connector.

10. The controller of claim 8, wherein the power flow direction circuit is arranged to selectively operate a subtractor circuit.

11. A method of reducing the capacitance of a dc link in a power circuit, wherein the dc link includes:
    a first connector for connecting to an output of a first power conversion circuit:
    a second connector for connecting to an input of a second power conversion circuit, wherein the second power conversion circuit is connected to a load circuit arranged to at least intermittently operate as a power source to the power circuit;
    at least one dc link capacitor arranged between said first connector and said second connector for processing a voltage signal received at said first connector or said second connector; and
    at least one voltage compensation circuit arranged between said first connector and said second connector and in connection with the at least one dc link capacitor, said one or more voltage compensation circuits arranged to generate a voltage signal to counter an ac ripple component in a dc voltage signal appearing across the at least one dc link capacitor, so as to provide a smooth dc voltage signal to the second power conversion circuit;
    wherein a combination of the at least one dc link capacitor and the at least one voltage compensation circuit is connected to the first connector and the second connector via a plurality of dc bus lines;
    the method comprising:
       sampling the dc link capacitor voltage signal;

generating from said sampled dc link capacitor voltage signal a conditioned dc link capacitor voltage ripple signal;
sensing an output voltage signal of the voltage compensation circuit;
conditioning the sensed output voltage signal of the voltage compensation circuit;
obtaining a dc offset signal from the sensed output voltage signal of the voltage compensation circuit;
compensating said conditioned dc link capacitor voltage ripple signal using the dc offset signal; and
obtaining drive signals for an active switching circuit of the dc link module from said compensated and said conditioned dc link capacitor voltage ripple signal.

* * * * *